United States Patent [19]

Kelemen et al.

[11] Patent Number: 5,627,702
[45] Date of Patent: May 6, 1997

[54] HEAD POSITIONER STACK FOR HIGH-CAPACITY DISC DRIVES

[75] Inventors: Bradley D. Kelemen, Santa Cruz; Boris Dushine; Hatem Radwan, both of San Jose, all of Calif.

[73] Assignee: Seagate Technology, Inc., Scotts Valley, Calif.

[21] Appl. No.: 513,279

[22] Filed: Aug. 10, 1995

[51] Int. Cl.$^6$ ........................................... G11B 5/55
[52] U.S. Cl. .................................................. 360/106
[58] Field of Search ........................ 360/106, 99.08, 360/104

[56] References Cited

U.S. PATENT DOCUMENTS

5,003,420  3/1991  Hinlein ........................ 360/106
5,404,636  4/1995  Stefansky et al. ............ 29/603
5,491,598  2/1996  Stricklin et al. ............. 360/106

*Primary Examiner*—Stuart S. Levy
*Assistant Examiner*—Allen Cao
*Attorney, Agent, or Firm*—Edward P. Heller, III

[57] ABSTRACT

A rotary voice coil actuator assembly for a disc drive, including a stack of head/flexure/arm assemblies, spacers and an actuator motor coil assembly arrayed on a substantially cylindrical actuator body, all held in place between a radially extending flange at a first end of the actuator body and a nut engaged with threads at a second end of the actuator body, and further including a compliant washer interposed between the lowermost member of the stacked actuator elements and the nut. In a preferred embodiment, the compliant washer is formed with a circumferential corrugation.

7 Claims, 8 Drawing Sheets

FIG. 8

HEAD POSITIONER STACK FOR HIGH-CAPACITY DISC DRIVES

BACKGROUND OF THE INVENTION

1. Field of the Invention

This invention relates generally to the field of rigid disc drive data storage devices, and more particularly, but not by way of limitation, to an improved structure for a rotary actuator and associated head-mounting mechanism.

2. Brief Description of the Prior Art

Disc drive data storage devices of the type known as "Winchester" disc drives are well known in the industry. In such machines, digital data are recorded on and retrieved from a thin layer of magnetizable material on the surface of spinning discs. The recording and retrieval of data—also referred to as "writing" and "reading", respectively—is accomplished using a transducer carried in a slider body which includes a self-acting hydrodynamic air bearing which "flies" the transducer a very small distance above the surface of the disc. This slider/transducer subassembly is sometimes referred to collectively as a head, and typically a single head is associated with each disc surface. The heads are selectively moved, under control of electronic circuitry, to any one of a plurality of circular, concentric data tracks on the disc surface by an actuator device. In the current generation of rigid disc drive products, the most commonly used type of actuator is the rotary moving coil actuator, sometimes referred to as a rotary voice coil motor actuator.

In a typical disc drive incorporating a rotary voice coil motor actuator, a pivot shaft is fixedly mounted to the disc drive housing and an actuator body is rotatably coupled to the shaft by an arrangement of ball bearing assemblies. On one side of the rotatable actuator body is mounted a flat wound coil of conductive wire. This coil is held by the actuator body within the magnetic field of an array of permanent magnets, which are in turn also fixedly mounted to the disc drive housing. When controlled DC current is applied to the coil, a magnetic field is created about the coil which interacts with the magnetic field of the permanent magnets in accordance with the well known Lorentz relationship. This interaction is used to rotate the actuator body about the pivot shaft in a controlled manner.

Also mounted to the actuator body, typically on the side opposite the coil, is a vertically aligned array of heads. The heads are usually connected to the actuator body through an arrangement of rigid arms and a rather flexible head suspension or flexure. The flexure serves to apply a "downward" force on the head, i.e., toward the disc surface, to counterbalance the hydrodynamic lifting force of the slider, and maintain the head in a desired close spatial relationship to the spinning disc. The flexure is compliant in the roll and pitch axes of the head to allow the flying characteristics of the head to follow minor variations in the disc surface, and stiff in the yaw and in-plane axes of the head to permit accurate placement of the head relative to the data recorded on the disc.

Historically, the heads and flexures were manufactured as a subassembly, with the ends of the flexure opposite the heads including a relatively heavy mounting plate. This mounting plate was attached to a rigid arm using machine screws, and the arms were in turn then attached to the actuator body, again with machine screws. This type of assembly did, however, have the drawback of limiting the proximity of adjacent head arm assemblies due to the vertical height of the screw heads.

Another drawback to the type of actuator assembly described above relates to the materials used for each of the major components. Typically, the flexure assembly used to support the heads was fabricated from 300 series stainless steel for strength and flexibility. The actuator body itself was made from aluminum or magnesium to minimize the mass of the moving portion of the actuator, while the head arms were also typically of magnesium. The result of these various materials was differential thermal expansion, i.e., the various components expanding and contracting at different rates over the specified thermal range of the disc drive. Thus the problems of differential thermal expansion, along with the previously mentioned difficulties in reducing the spacing between adjacent discs and the additional costs associated with drilling and tapping screw holes and the insertion and torquing of the screws, lead to the development of the next generation of head mounting technology.

In order to mount the heads in closer proximity, and thus bring the discs closer together and increase the disc drive capacity, swage mounting of the heads to arms precast as integral parts of the actuator body was the next logical step. Since the swaging could be accomplished on all heads in a single operation, the arms could be made part of the actuator body, eliminating the manufacturing step of attaching the arms to the actuator body. This type of assembly also contributed greatly to the consistent vertical alignment of the heads in the array, which allowed greater accuracy in the alignment of the heads with the data tracks. It did, however, still suffer from problems of differential thermal expansion, due to the mixture of component materials.

With the advent of smaller and smaller disc drive form factors, attempts to lessen the spacing between heads and discs lead to a third generation of actuator assembly. This third generation structure combined the head/flexure assemblies with the head arms, with both of these major components made of stainless steel, to reduce differential thermal expansion problems. The head arms were formed with circular openings at the end opposite the flexure assembly.

The actuator body was, in turn, simplified to a cylindrical shape, with a projecting flange at one end and external threads on the other end. During manufacture, a plurality of head/flexure/arm assemblies was placed over the cylindrical actuator body, along with appropriate spacers, and brought to rest in contact with the protruding flange. A coil, which also included a circular mounting ring which acted as one of the spacers in the head stack, was similarly mounted to the actuator body extending away from the head arms. Once the desired configuration of heads and coil was complete, a threaded nut was screwed onto the external threads on the end of the actuator body opposite the flange, and tightened to squeeze the head/flexure/arm assemblies and coil together.

This third type of assembly did, however, also have a disadvantage. Disc drives of this type were frequently made in the 2.5" form factor for use in portable or laptop computer systems. Disc drives employed in such systems typically are required to be able to withstand non-operating mechanical shocks in excess of 100 G. Furthermore, when the disc drive experienced "runaway" conditions, the actuator assembly could contact the limit stop of the unit at high speed, subjecting the actuator to up to 1000 Gs. Future disc drives, having more powerful actuator motors, can be expected to provide even greater forces. This meant that the head stack had to be clamped together with sufficient force to prevent any shift in the relative positions of the heads, as well as the coil. In order to accomplish this large clamping force, the flange on the actuator body must be fairly robust, and the clamping force is controlled by the amount of torque applied to the locking nut at the end of the actuator body opposite the flange.

As previously mentioned, however, the actuator body was typically made of magnesium or other lightweight material, while the flexure/arm assemblies were made from stainless steel. Even if, as is the case of the preferred embodiment of the present invention, the actuator body were also to be made of steel, subtle differences between the coefficients of thermal expansion for various types of steel produced similar, if lesser, differential thermal expansion characteristics. This lead to certain problems with differential thermal expansion, in this case, in the axial direction of actuator body/ball bearing structure. Specifically, when the disc drive was subjected to thermal excursions within the specified allowable thermal range, the expansion and contraction of the mounting rings of the head arms and coil tended to increase and decrease the clamping force of the nut/flange combination. In order to compensate for this variation, the flange of the actuator body was dimensioned to provide a certain amount of compliance, so that the clamping force could be maintained within a desired range.

If the stack of actuator components were assembled without any compliance—that is, the flange on the actuator body was dimensioned to be substantially noncompliant and the amount of clamping force was controlled solely by the amount of torque applied to the nut during manufacture—inevitable variations in the manufacturing process, such as torquing tool calibration, operator induced variabilities, and component tolerance variations, resulted in unacceptable variation in the clamping force applied to the assembly. That is, for example, small variations in the torque applied to the nut caused relatively large and unacceptable variation in the clamping force applied.

Furthermore, vibration and thermal excursions which would be within the specified acceptable range for the finished disc drive unit could cause loosening of the nut in such non-compliant assemblies, and component "creep" could also result in unacceptable variation in the axial load force applied to the actuator assembly.

Thus the requirement that the actuator body flange be robust—or non-compliant—to provide sufficient clamping force, and at the same time compliant, to allow for differential thermal expansion, lead to unacceptable compromises in the actuator design.

Designing a compliant flange with an acceptable spring rate is difficult, and may well be impossible as requirements for greater and greater shock tolerance are made by the marketplace. That is, the spring rate must be as low as possible, so that the axial load changes little for changes in deflection of the flange. But the axial load must be as high as possible to prevent relative movement of the heads and coil. Since a low spring rate gives a low yield strength, a tradeoff must be made. Unfortunately, a flange that is strong enough to contribute to the required axial load force would give essentially no deflection capability within the head/coil stack to compensate for differential thermal expansion of the various components.

A need clearly exists, therefore, for a head stack design that provides both high axial clamping force and sufficient compliance to allow for differential thermal expansion and manufacturing and environmental considerations noted above.

SUMMARY OF THE INVENTION

The actuator design of the present invention includes a compliant spring member positioned between the nut used to apply clamping force to the head/coil stack and the adjacent member of the stack. The compliant spring member, hereinafter also referred to as the complaint washer, is designed to provide desired compliance within the stack structure, while allowing sufficient clamping force to be applied to the head/coil stack to allow the disc drive to meet its specified mechanical shock specification. In the preferred embodiment, the compliant washer is formed with a circumferential corrugation.

It is an object of the invention to provide an actuator structure that is simple and inexpensive to manufacture in a high volume production environment.

It is another object of the invention to provide, on an actuator structure that includes a plurality of head/flexure/arm assemblies arranged in a stacked arrangement on a substantially cylindrical pivot member, apparatus for clamping the stack of head/flexure/arms which is sufficient to prevent relative movement of the head/arms.

It is another object of the invention to provide such clamping apparatus which also furnishes sufficient compliance to allow for differential thermal expansion of the structural members and normal variations in the manufacturing process and the components of the assembly.

These and other objects, benefits and advantages of the present invention may best be understood by reading the following detailed description of the invention in conjunction with the accompanying drawings.

DETAILED DESCRIPTION OF THE PREFERRED EMBODIMENT

Figure 1:
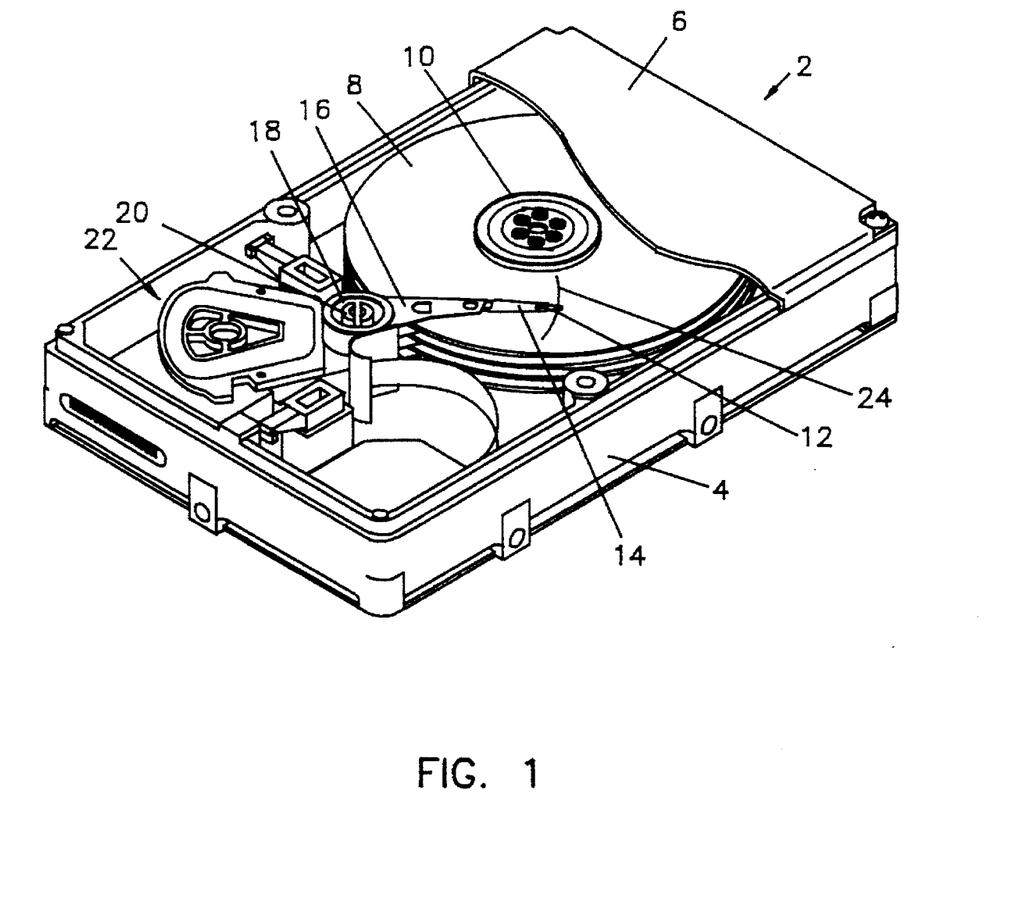
FIG. 1 is a perspective view of a disc drive in which the present invention is particularly useful.

Turning now to the figures, and more particularly to FIG. 1, shown is a disc drive 2 of the type in which the present invention is particularly useful. The disc drive 2 includes a base member 4, to which all other components are either directly or indirectly mounted, and a top cover 6 (shown in partial cutaway) which act together to form a sealed housing within which the delicate internal components are protected from external contaminants. The disc drive 2 also includes a plurality of discs 8 mounted using a disc clamp 10 on a spindle motor (not shown) for rotation at a constant high velocity. A plurality of heads (one shown at 12) are mounted in a vertically aligned array via a plurality of flexures 14 and head arms 16 to an actuator body 18, which is journalled via ball bearings (not shown) for rotation about a pivot shaft 20 under control of an actuator motor, shown generally at 22.

The actuator motor thus causes the heads 12 to be controllably moved radially across the discs 8 along arcuate path 24.

Figure 2:
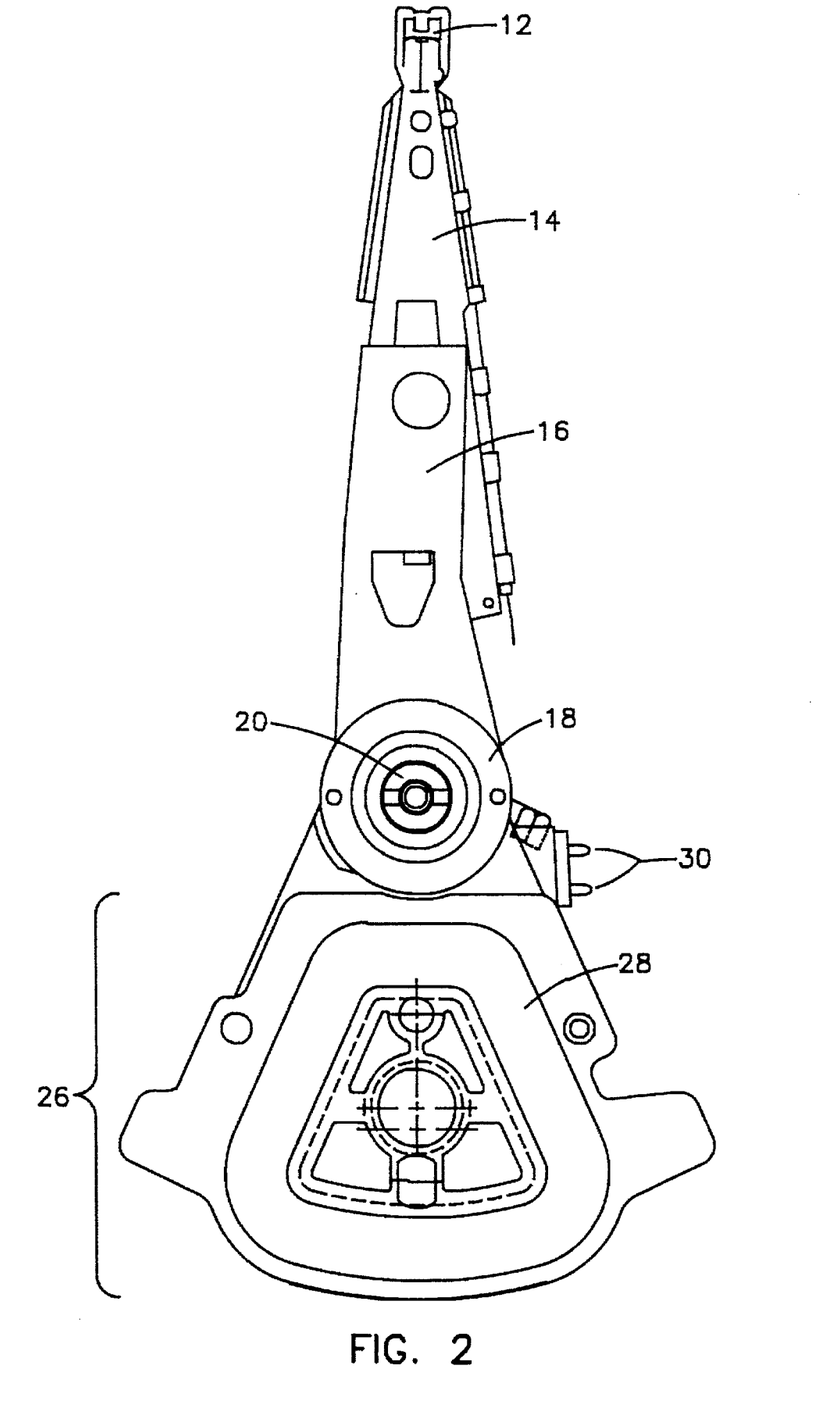
FIG. 2 is a plan view of the moving portion of the actuator assembly which is a part of the disc drive of FIG. 1.

FIG. 2 is a plan view of the moving portion of the actuator assembly shown in the disc drive of FIG. 1, and is provided to show the relationship between the head 12, the flexure 14, the head arm 16 and the actuator body 18. The actuator body 18 can be formed from aluminum or magnesium or other lightweight material to minimize the moving mass of the actuator. However, in the presently preferred embodiment of the invention, the actuator body is formed of stainless steel. In the embodiment shown, the head arm 16 and flexure 14 are also formed of series 300 stainless steel, are fixedly attached to each other, and mounted to the actuator body 18 in a manner to be described in detail below. Details of the mounting of the actuator body 18 to the pivot shaft 20 will also be provided below.

FIG. 2 also shows a plan view of an actuator motor coil assembly 26, which, in turn, includes a coil 28. The ends of the wire which makes up the coil 28 are terminated at pins 30, which connect to a flexible printed circuit cable (PCC) (shown at 32 in FIG. 1) to carry the controlled dc drive current to the coil 28.

Figure 3:
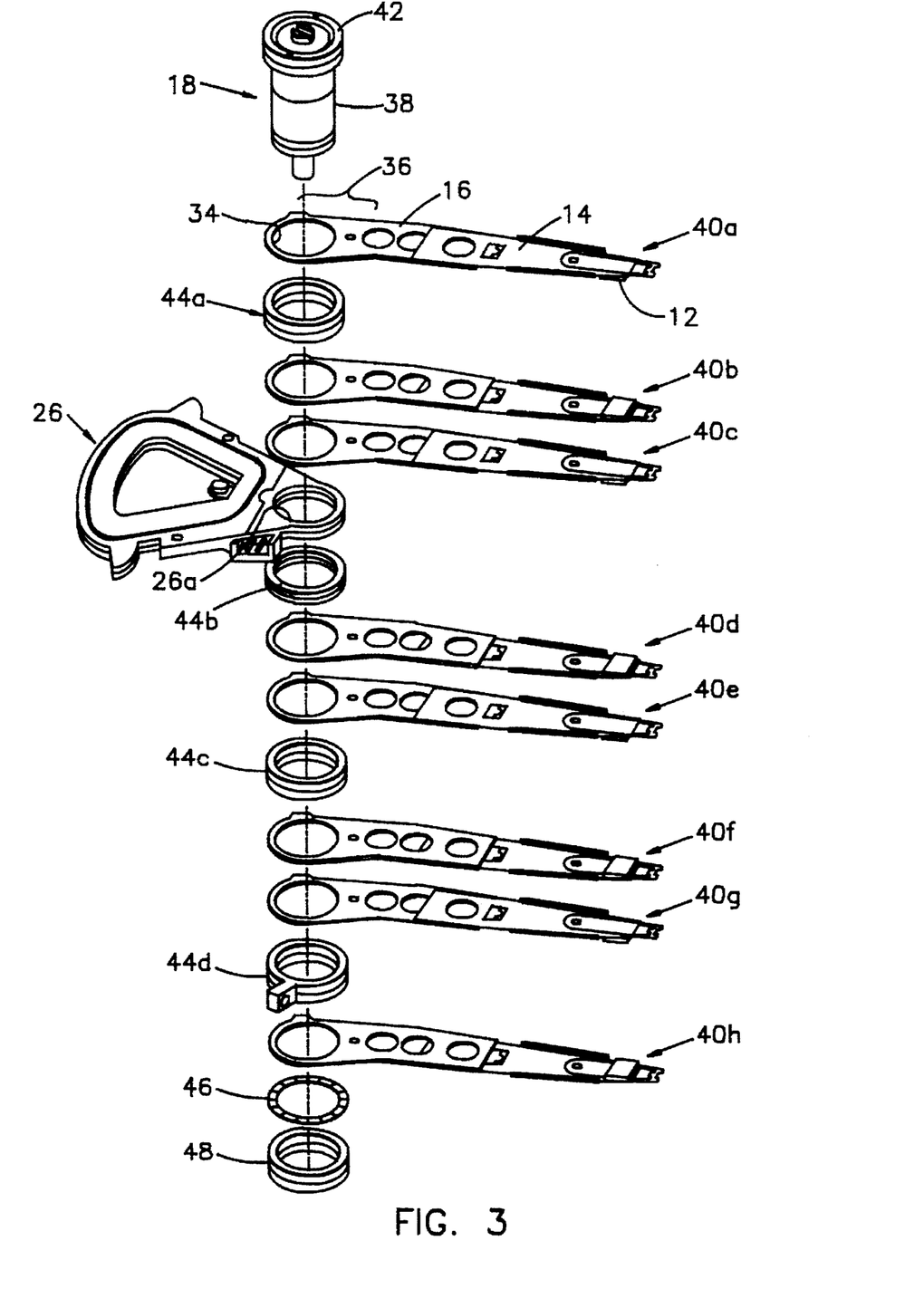
FIG. 3 is an exploded isometric view of the components that make up the moving portion of the actuator assembly of FIG. 2.

Details of the assembly of the moving portion of the actuator can best be seen in the exploded isometric view of FIG. 3. In FIG. 3, it is apparent that each head 12 is mounted to a flexure 14, which is, in turn, attached to a head arm 16. These subassemblies will be referred to hereinafter as head/flexure/arm assemblies, or hfa assemblies, and are numbered in FIG. 3 as 40a through 40h. Each head arm 16 incorporates a circular opening 34 in its mounting end 36, and this circular opening 34 is dimensioned to fit closely over the cylindrical portion 38 of the actuator body 18. It will also be apparent to those of skill in the art that FIG. 3 shows both "up" and "down" hfa assemblies, e.g., in the topmost hfa 40a, the head 12 is mounted on the lower side of the flexure 14, and thus faces "downward" to engage the upper surface of a disc (not shown), while in the bottommost hfa 40h, the head is mounted on the upper side of the flexure and faces "upward" to engage the lower surface of a disc. The need for this distinction will become apparent during the discussion of FIG. 5 below.

During assembly of the actuator, the topmost hfa assembly 40a is slipped over the cylindrical portion 38 of the actuator body 18 and brought to bear on a radially extending flange 42 of the actuator body 18. The first of several spacers 44a is then mounted next to topmost hfa assembly 40a, and the second and third hfa assemblies 40b, 40c are assembled onto the actuator body next to the first spacer 44a. As can be seen in FIG. 3, the actuator motor coil assembly 26 also includes a mounting opening 26a, also dimensioned to closely engage the cylindrical portion 38 of the actuator body 18, and this actuator motor coil assembly 26 is placed on the actuator body after hfa assemblies 40b, 40c. This is followed by spacer 44b, hfa assemblies 40d, 40e, another spacer 44c, hfa assemblies 40f, 40g, spacer 44d and the lowermost hfa assembly 40h.

Once the lowermost hfa assembly 40h is in place on the actuator body 18, a special compliant washer 46, which forms a part of the present invention, is placed on the actuator body and a nut 48 is threaded onto matching external threads on the actuator body 18 to clamp the entire assembly together.

Figure 4A:
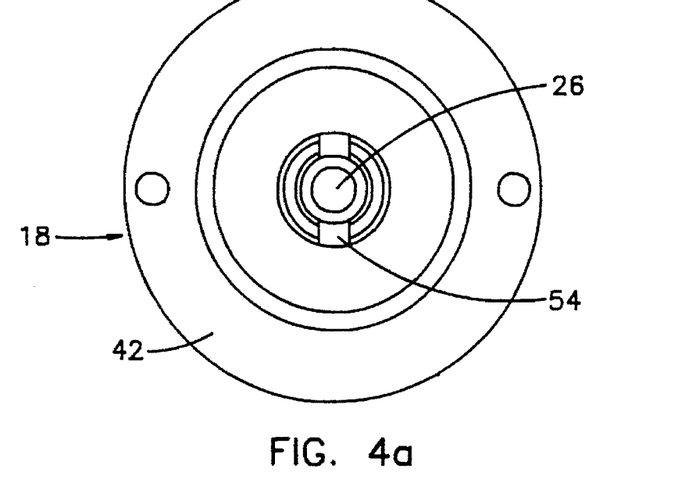
FIGS. 4a and 4b are plan and elevation views, respectively, of the actuator body which forms a part of the moving portion of the actuator assembly of FIGS. 2 and 3.
Figure 4B:
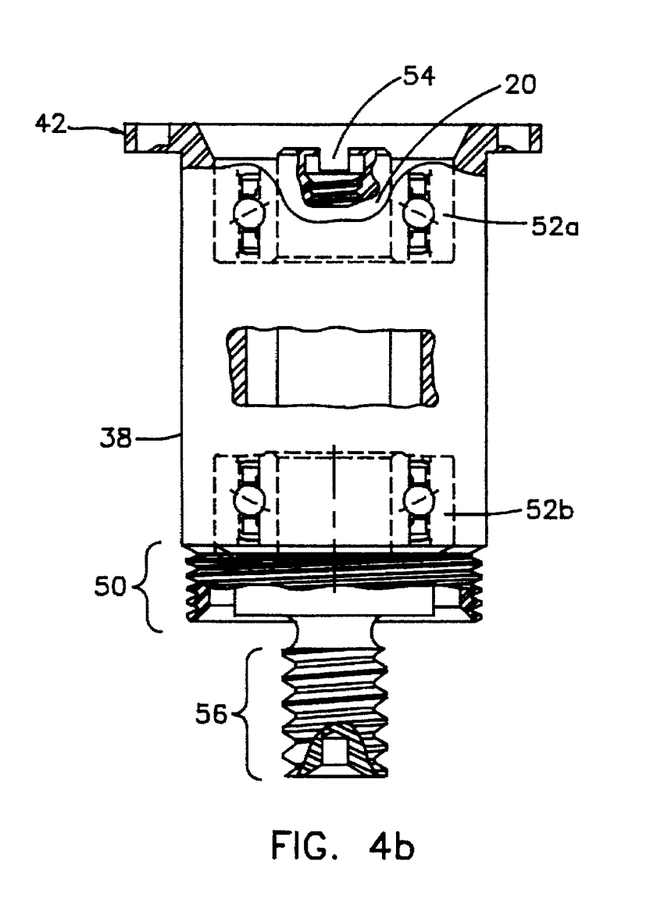

Before examining the completed assembly, it is perhaps best to briefly describe the actuator body 18 and pivot shaft 20 assembly in more detail. Turning, therefore, to FIGS. 4a and 4b, shown are plan view and elevation view respectively of the actuator body/pivot shaft assembly. The elevation view of FIG. 4b includes several cutaway portions and "ghost" views of internal structure which will be readily understood by those of skill in the art. In the presently preferred embodiment, the actuator body 18 is formed of austenitic stainless steel. The actuator body 18 is substantially a hollow cylinder with a cylindrical portion 38 and a radially extending flange 42 at a first end, and external threads 50 at a second end thereof. Upper and lower ball bearing assemblies 52a, 52b engage the inner surface of the actuator body and the pivot shaft 20, allowing the actuator body 18 to rotate relative to the pivot shaft 20. It can also be noted that the pivot shaft 20 includes a slot 54 at its first end and extends beyond the actuator body at a second end and also includes external threads 56 for mounting the entire assembly to the housing base member (4 in FIG. 1).

Figure 5:
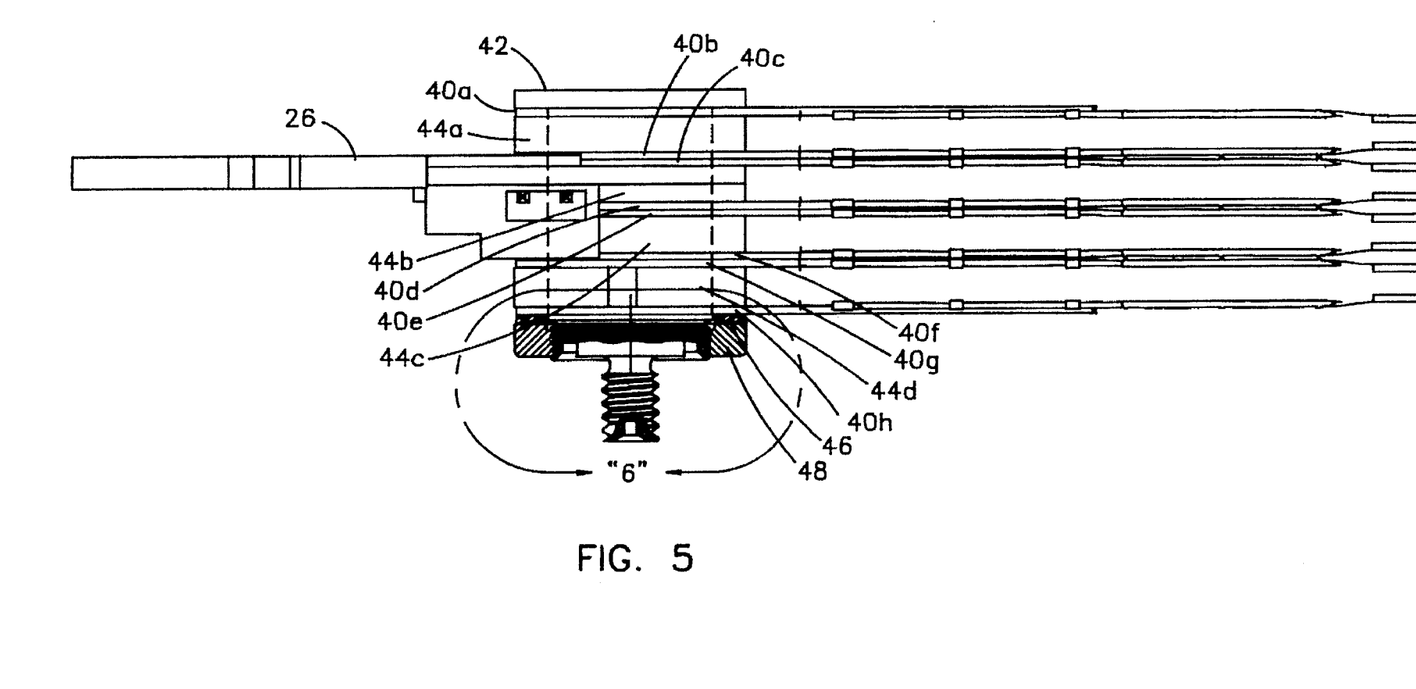
FIG. 5 is a side elevation of the moving portion of the actuator assembly of FIGS. 2 and 3.

Turning now to FIG. 5, shown is a side elevation view of a complete assembly of the moving portion of the actuator. The components of the assembly, from top to bottom of the figure, include the flange 42 of the actuator body, the uppermost hfa assembly 40a, the first spacer 44a, hfa assemblies 40b, 40c, the actuator motor coil assembly 26, second spacer 44b, hfa assemblies 40d, 40e, spacer 44c, hfa assemblies 40f, 40g, spacer 44d, lowermost hfa assembly 40h, compliant washer 46, and nut 48. It should be noted that the embodiment illustrated is for a disc drive which utilizes four discs and eight heads, and that the discs would thus be located in the completed drive in those spaces between hfa assemblies 40a and 40b, between hfa assemblies 40c and 40d, between hfa assemblies 40e and 40f, and between hfa assemblies 40g and 40h, as will be appreciated by those of skill in the art. The present invention should, however, not be thought of as being limited by the number of heads and discs in the disc drive assembly, and is effective in units utilizing either a greater or lesser number of these components.

It will also be apparent to one of skill in the art that the second spacer 44b, in combination with the mounting portion of the actuator motor coil assembly 26, forms the same vertical spacing as the individual spacers 44a, 44c, and 44d.

As was previously mentioned above, in prior art designs of this type of actuator assembly, there was no compliant washer 46 between the lowermost hfa assembly 40h and the nut 48, and compliance to allow for differential thermal expansion and contraction and to compensate for manufacturing variations, as mentioned above, was accomplished by forming the flange 42 with a thickness small enough to be compliant under the mechanical stresses involved. This approach did, however, result in unsatisfactory compromises between providing a flange that was stiff enough to allow for the requisite clamping force required by the assembly, and compliant enough to allow for "give" during thermally induced expansion of the actuator components.

In the embodiment of the present invention shown in FIG. 5, the flange 42 is robust enough to be substantially non-compliant under intended clamping forces, and the compliance necessary to allow for differential thermal expansion and manufacturing variables is provided by the compliant washer 46.

Figure 6:
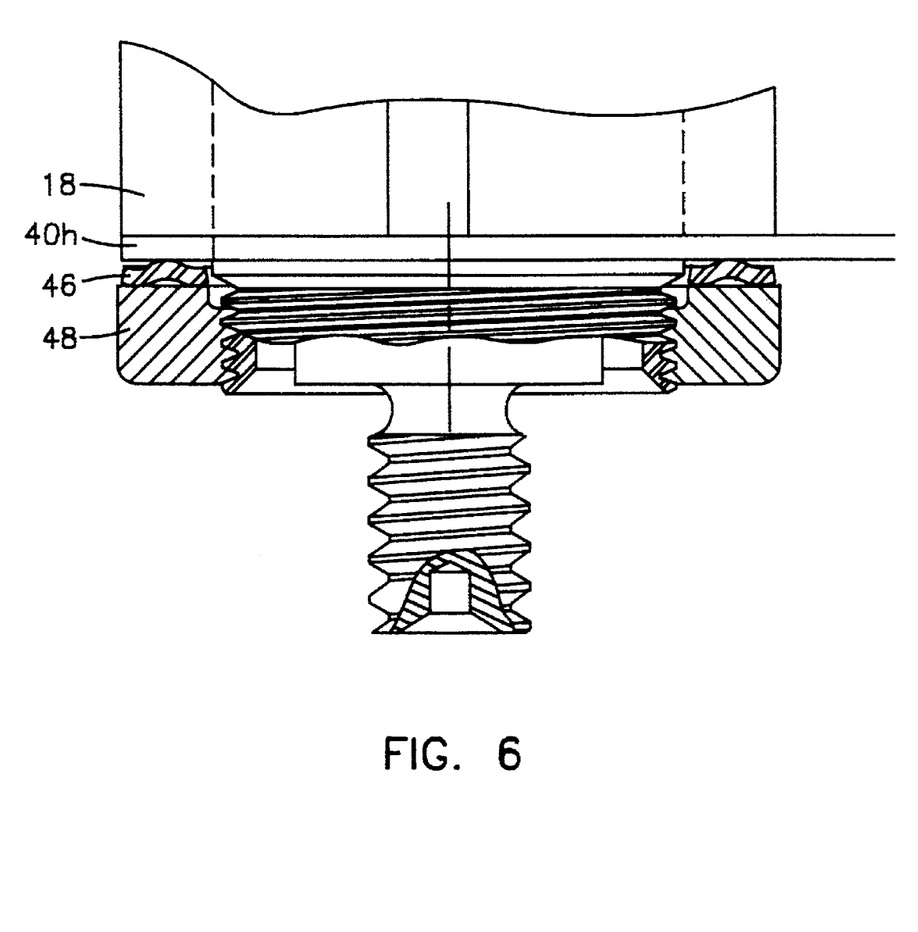
FIG. 6 is a detail view of a portion of the side elevation view of FIG. 5.

FIG. 6 is a detail view of that portion of FIG. 5 designated "6", and shows in more detail the location of the compliant washer 46 in relationship to the actuator body 18, the lowermost hfa assembly 40h and the nut 48. In the figure, the compliant washer 46 and nut 48 are shown in section, while the threaded portion of the actuator body 18 is shown in partial cutaway. As can be seen, the compliant washer 46 contacts the lowermost hfa assembly 40h of the actuator assembly and the uppermost surface of the nut 48. Details of the fabrication of the compliant washer 46 can best be seen by examining FIGS. 7a, 7b and 8.

Figure 7A:
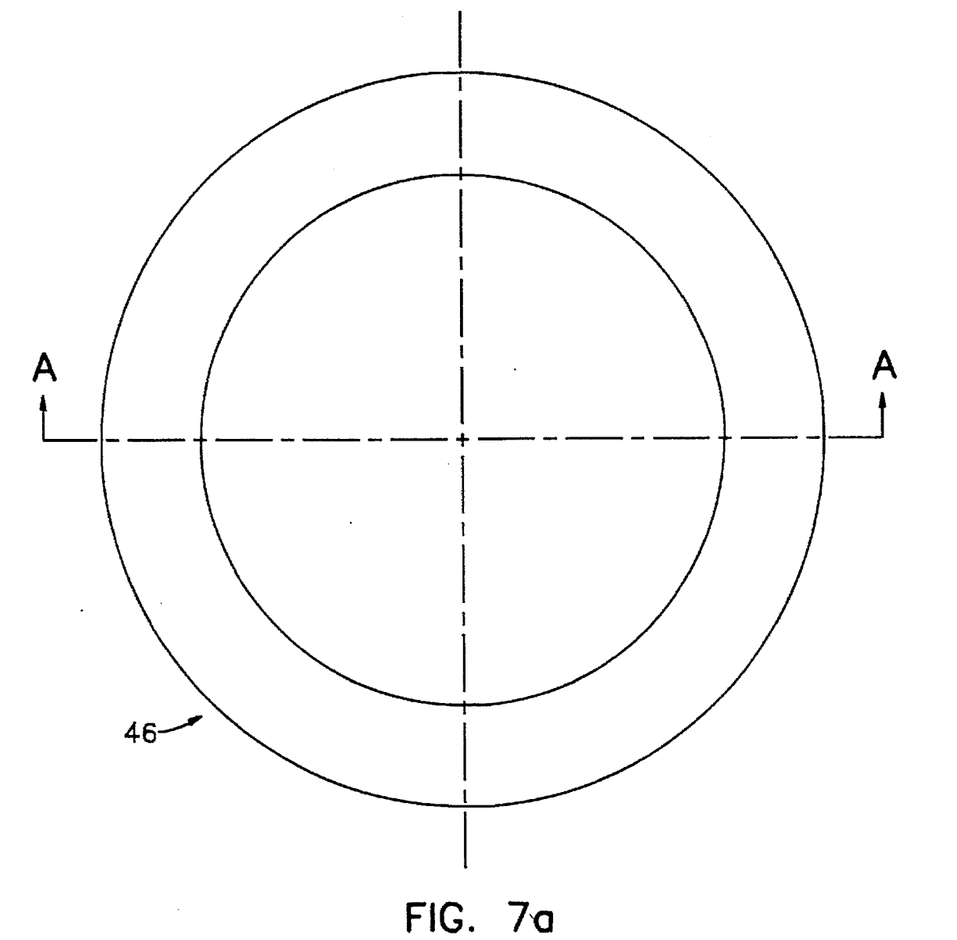
FIGS. 7a and 7b are plan and sectional elevation views, respectively, of the compliant washer which forms a part of the present invention.
Figure 7B:
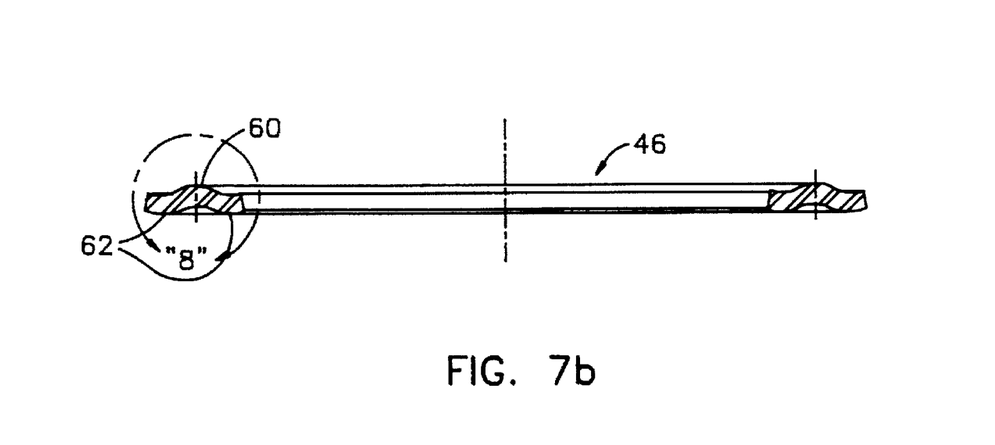
Figure 8:
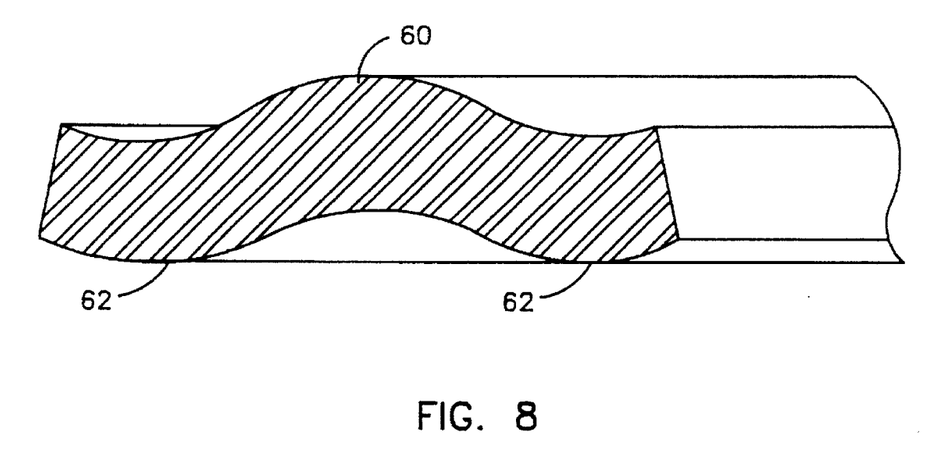
FIG. 8 is a detail view of a portion of the sectional elevation view of FIG. 7b.

FIGS. 7a and 7b are plan and sectioned elevation views respectively of the compliant washer 46 which forms a part of the present invention, while FIG. 8 is a detail view of that portion of FIG. 7b designated "8". As the figures show, the compliant washer is corrugated in a circumferential manner, which forms a circular upper contact surface 60 and two circular lower contact surfaces 62 which are disposed radially inward and outward of the upper contact surface 60. In the presently preferred embodiment, the compliant washer 46 is formed from series 302, full hard, stainless steel 0.008 inches thick, and formed to a nominal overall thickness of 0.013 inches. This configuration in a present generation 2.5 inch disc drive allows for a total clamping force of 150 pounds, while still allowing for differential thermal expansion of the actuator components along the axis of the pivot mechanism. This design of compliant washer also provides the necessary compliance to ensure that the manufacturing and component variables mentioned above do not result in unacceptable variation in the clamping force applied to the stacked components in the assembly.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a controllably rotatable actuator assembly, the actuator assembly comprising:

a substantially cylindrical actuator body having a first end, a second end, and a cylindrical portion therebetween, the actuator body defining a central axis of rotation for the actuator assembly, the actuator body further comprising: a flange radially extending from the first end; and threads located at the second end;

a plurality of actuator arm assemblies, each actuator arm assembly having an opening sized to closely engage the cylindrical portion of the actuator body;

an actuator motor coil assembly having an opening sized to closely engage the cylindrical portion of the actuator body; and a plurality of spacers, each spacer having an opening sized to closely engage the cylindrical portion of the actuator body;

wherein the actuator arm assemblies, the actuator motor coil assembly and the spacers are arranged to form an actuator stack about the cylindrical portion of the actuator body, and wherein the actuator assembly further comprises a nut engaging the threads and capturing the actuator stack about the cylindrical portion of the actuator body, the nut having an outer surface at a radial extent from the actuator body; the improvement comprising:

compliant spring means, disposed between the nut and the actuator stack and having a central opening to accommodate the cylindrical portion of the actuator body, for accommodating differential thermal expansion of the actuator arm assemblies, the actuator motor coil assembly and the spacers, and for providing a clamping force upon the actuator stack at a radius about and in a direction of the central axis.

2. The improvement of claim 1, wherein the compliant means comprises a compliant washer comprising a generally disc shaped spring member having an inner radius and an outer radius, the compliant washer further including a circumferential corrugation disposed between the inner radius and the outer radius, the circumferential corregation further disposed within the radial extent of the outer surface of the nut.

3. The improvement of claim 2, wherein the compliant washer further includes a circular upper contact surface and two lower contact surfaces which are disposed radially inward and outward of the upper contact surface, the upper contact surface contacting the actuator stack and the lower contact surfaces contacting the nut.

4. The improvement of claim 2, wherein the compliant washer is formed from full hardened series 302 stainless steel.

5. An actuator assembly for a disc drive, the actuator assembly comprising:

an actuator body comprising a first end, a second end, and a cylindrical portion therebetween, the actuator body further comprising: a flange radially extending from the first end; and threads located at the second end;

an actuator stack disposed about the cylindrical portion of the actuator body, the actuator stack comprising:

a plurality of actuator arm assemblies, each actuator arm assembly having an opening sized to closely engage the cylindrical portion of the actuator body;

an actuator motor coil assembly having an opening sized to closely engage the cylindrical portion of the actuator body; and a plurality of spacers, each spacer having an opening sized to closely engage file cylindrical portion of the actuator body;

a nut engaging the threads and capturing the actuator stack about the cylindrical portion of the actuator body, the nut having an outer surface disposed at a radial extent from the actuator body; and a compliant spring member disposed between the nut and the actuator stack, the compliant spring member having a central opening to accommodate the cylindrical portion of the actuator body and a circumferentially extending corrugation disposed within the radial extent of the outer surface of the nut, the circumferentially extending corrugation contacting the actuator stack and exerting a clamping force upon the actuator stack so that the actuator stack is secured between the compliant spring member and the flange of the actuator body for accommodating differential thermal expansion of the actuator am assemblies, the actuator motor coil assembly and the spacers.

6. The actuator assembly of claim 5, wherein the compliant spring member further includes a circular upper contact surface and two lower contact surfaces which are disposed radially inward and outward of the upper contact surface, the upper contact surface contacting the actuator stack and the lower contact surfaces contacting the nut.

7. The actuator assembly of claim 5, wherein the compliant spring member is formed from full hardened series 302 stainless steel.

* * * * *